US006595767B1

(12) United States Patent
Hinzpeter et al.

(10) Patent No.: US 6,595,767 B1
(45) Date of Patent: Jul. 22, 2003

(54) ROTARY COMPRESSION PRESS

(75) Inventors: Jürgen Hinzpeter, Schwarzenbek (DE); Ulrich Arndt, Lauenburg (DE); Heinrich Behrmann, Schwarzenbek (DE); Helmut Bommrowitz, Mölln (DE); Thomas Heinrich, Stelle (DE); Thomas Jacob, Geesthacht (DE); Peter Lüneburg, Berkenthien (DE); Nils Petersen, Hohnstorf (DE); Hans-Joachim Pierags, Pronstorf (DE); Wolfgang Röhrs, Mölln (DE); Elke Wittenberg, Gülzow (DE); Hans Wolf, Schwarzenbek (DE); Ulrich Zeuschner, Schwarzenbek (DE)

(73) Assignee: Wilhelm Fette GmbH, Schwarzenbek (DE)

( * ) Notice: Subject to any disclaimer, the term of this patent is extended or adjusted under 35 U.S.C. 154(b) by 327 days.

(21) Appl. No.: 09/618,677

(22) Filed: Jul. 19, 2000

(30) Foreign Application Priority Data

Aug. 27, 1999 (DE) ........................................ 199 40 701

(51) Int. Cl.[7] ................................................ B29C 43/08

(52) U.S. Cl. .................. 425/214; 425/345; 425/348 R; 425/353

(58) Field of Search .......................... 425/345, 78, 352, 425/353, 354, 355, 348 R, 214

(56) References Cited

U.S. PATENT DOCUMENTS

| | | | | | |
|---|---|---|---|---|---|
| 5,116,214 | A | * | 5/1992 | Korch et al. | 425/345 |
| 5,366,047 | A | * | 11/1994 | Beck et al. | 188/73.37 |
| 5,755,152 | A | * | 5/1998 | Menzin | 425/261 |
| 5,906,837 | A | * | 5/1999 | Link et al. | 425/78 |
| 6,299,428 | B1 | * | 10/2001 | Ingram | 425/168 |

FOREIGN PATENT DOCUMENTS

| | | |
|---|---|---|
| DE | 88 16 064 | 4/1989 |
| EP | 0 448 190 | 3/1991 |

* cited by examiner

*Primary Examiner*—Robert Davis
*Assistant Examiner*—Thu Khanh T. Nguyen
(74) *Attorney, Agent, or Firm*—Vidas, Arrett & Steinkraus, P.A.

(57) ABSTRACT

A rotary compression press for cylindrical compacts, especially tablets, comprising a rotatably driven rotor including a die-plate and an upper and a lower ram guide for upper and lower rams cooperating with the die bores, and a pressure station with an upper and a lower pressure roller for applying a pressing power to the rams wherein the rams circumferentially have an annular tooth system which cooperates with an opposed tooth system in the area of a pressure station for the rams for the purpose of rotating the rams in the die bores thereof, characterized in that the opposed tooth system is defined by a rotatably supported gear which is acted on by a preset braking torque with the braking torque being chosen so as to be smaller than the torque of the ram when under a maximum pressing power.

10 Claims, 2 Drawing Sheets

ROTARY COMPRESSION PRESS

CROSS-REFERENCE TO RELATED APPLICATIONS

Not Applicable

STATEMENT REGARDING FEDERALLY SPONSORED RESEARCH

Not Applicable

BACKGROUND OF THE INVENTION

This invention relates to a rotary compression press for cylindrical compacts, especially tablets.

From DE-GM 88 16 064, a rotary compression press of the generic type is known in which the shank of the pressing rams has a tooth system which cooperates with a stationarily disposed rack. The rotational motion of the upper and lower rams immediately after the pressing operation and during the withdrawal of the ram from the die is intended to achieve separation from the surface of the tablet which has been pressed. In the case of particularly adhesive materials being compressed adherence must be feared between the rams and the material if there is no rotation. The drawback of the known press is that if the tooth systems of the upper and lower rams engage the rack jammings might occur, depending on the position in which the respective upper and lower rams have stopped after exiting from the rack concerned. Another drawback is that the rams will rotate only after passing the pressure rollers. This does not prevent the pressed compacts from adhering to the rams already before a rotation is performed.

From EP 0 448 190, a rotary compression press has become known in which the upper and lower rams are guided in bushings which, in turn, are pivotably supported and are toothed in order to cooperate with a stationary tooth system. The shanks of the rams are guided in the bushings in a linear manner. The drawback of this relatively expensive assembly is that the rams will rotate even under a maximum pressing power. This, however, will result in significant wear and also may have an adverse effect on the material compression which is desired. In order to reduce wear to the pressure rollers and the heads of the rams facing them it also has become known already to design the rams in two parts and to make them rotatable with respect to each other. While this will save the head of the ram it will cause considerable stress to act upon the bearings between the ram parts. Moreover, such bearings are exceptionally expensive.

It is the object of the invention to provide a rotary compression press wherein the rotational motion of the pressing rams is produced by simple means and significant wear is avoided at the same time.

BRIEF SUMMARY OF THE INVENTION

In the inventive rotary compression press, the opposed tooth system is defined by a rotatably supported gear which is acted on by a preset braking torque. The braking torque has been chosen so as to be smaller than the torque of the ram when under a maximum pressing power.

The invention is based on the finding that although it is desirable to effect a rotation of the rams when a pressing power is still exerted thereon this need by no means be the maximum pressing power. Rather, it will be sufficient for a rotation to be effected only when the pressing power has reached a relatively low value. In such a case, this rotation will no longer have an adverse effect on the head of the ram and the pressure roller. According to the invention, this will be achieved by the action of a certain braking torque on the gear, which causes the gear to rotate along if the braking torque is smaller than the torque required to rotate the ram. Therefore, if pressing powers are more or less large, especially if the pressing power is a maximum, the ram will not rotate even if the tooth system of the ram is in engagement with the gear. Not until the torque falls below the braking torque on the ram the gear will stop and the ram will then undergo a rotation. Although the rotation thus caused will take place only along a short distance of travel of the ram and, hence, will only lead to a rotation at a small angle it will be completely sufficient to avoid adherence of the material to the ram and to bring about the release of material which adheres thereto.

The braking torque is tailored so as to effect a rotation of the pressing ram only if the pressing power is such as to produce a torque which is merely a fraction of the maximum pressing power.

Since it cannot be ensured that the tooth systems engage each other completely from the very beginning, but the teeth may happen to stand upon one another initially, the spring assembly, in an aspect of the invention, provides that the gear may be compliant until the tooth systems fully slide into engagement. It is understood that the bearing component abuts against a stop on the side opposed to the spring assembly in order to give the gear a proper initial position for engagement of the ram with the gear.

Various constructional options are imaginable to cause a braking moment to act upon the gear. According to the invention, one of them is that the gear has at least one of its front-end face fitted with a friction surface which cooperates with an opposite friction surface each. Preferably, the friction surfaces are pressed against one another by a spring assembly. In another aspect of the invention, the spring assembly may be formed by a pack of disk springs. The bias of the braking spring is preferably variable to make a desired braking torque adjustable.

BRIEF DESCRIPTION OF THE SEVERAL VIEWS OF THE DRAWINGS

The invention will now be explained in detail with reference to drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
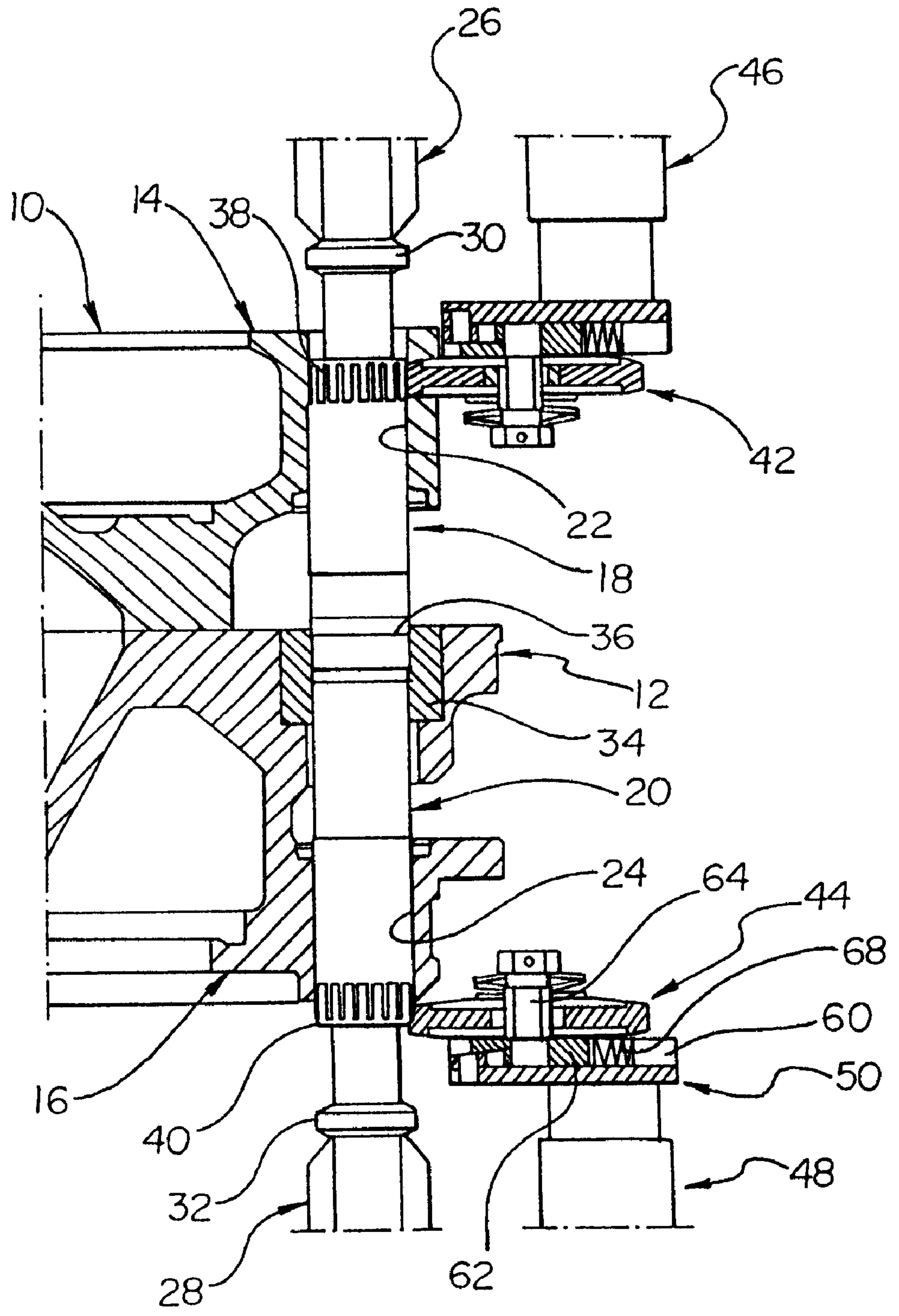
FIG. 1 shows a section of a rotor of a rotary compression press including an upper ram and a lower ram and a device according to the invention.

Referring to FIG. 1, a rotor 10 of a rotary compression press can be seen which has a die-plate 12, an upper ram guide 14, and a lower ram guide 16. The latter ones circumferentially retain a series of equally spaced upper and lower rams with only one upper ram 18 and a lower ram 20 being illustrated in FIG. 1. The shanks of rams 18, 20 are guided in bores 22 and 24, respectively, of ram guides 14, 16. FIG. 1 illustrates the arrangement of rams 18, 20 in a pressure station which is defined by an upper pressure roller 26 and a lower pressure roller 28. Pressure rollers 26, 28 cooperate with heads 30, 32 of rams 18, 20. Ram 20 is permanently below a die 34 of the die-plate into which powder-like material 36 is filled. Upper ram 18 will be outside die 34 during the filling operation. During the pressing process, upper ram 18 is introduced into the die and, along with lower ram 20, causes the material to be compressed in a way which is known as such. The plot characteristic of the pressing power applied by pressure rollers 26, 28 is of a sine curve type.

Pressing rams 18, 20 each have an annular tooth system 38 and 40 at their circumference. Annular tooth systems 38, 40 do not extend radially across the periphery of the shanks of rams 18, 20 so that they do not get into engagement with the bore wall of ram guides 14, 16. What further can be seen from FIG. 1 is that gears 42, 44 cooperate, via a circumferential tooth system, with the tooth systems 38, 40. With regard to tooth system 38, gear 42 extends through a lateral opening of ram guide 14. Gear 44 cooperates with tooth system 40 of lower ram 20 below ram guide 16. Gears 42, 44 are retained by mountings 46 and 48, respectively. The way of supporting gears 42, 44 and their mountings are described in greater detail with reference to FIGS. 2 and 3.

Figure 2:
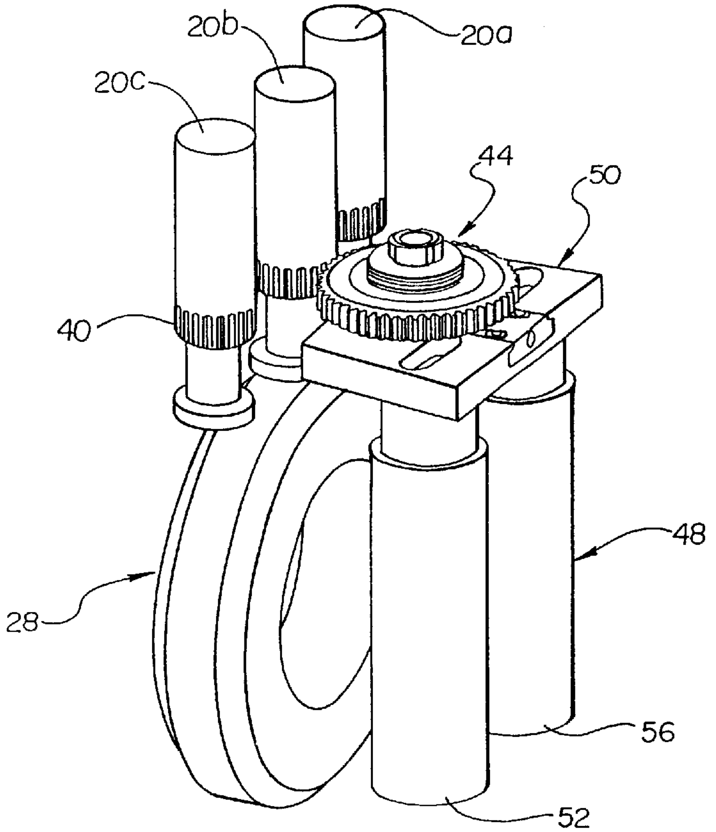
FIG. 2 shows a perspective enlarged view of the lower part of the device according to the invention of FIG. 1.

Referring to FIG. 2, only lower pressure roller 28 and lower gear 44 are illustrated. In contrast, lower ram 20 is shown in three different positions. However, it might also be a plurality of rams which are disposed in the rotor of FIG. 1.

A plate-shaped retaining component 50 rests on two columns 52, 56 which are mounted on the stand of the circular compression press in a manner which is not shown in detail. As can further be seen from FIG. 2 rams 20, while approaching gear 44, gradually get into engagement with the teeth of gear 44 until they will get out of engagement again while moving away. Engagement essentially takes place while rams 20 are under actuation by pressure roller 28.

Figure 3:
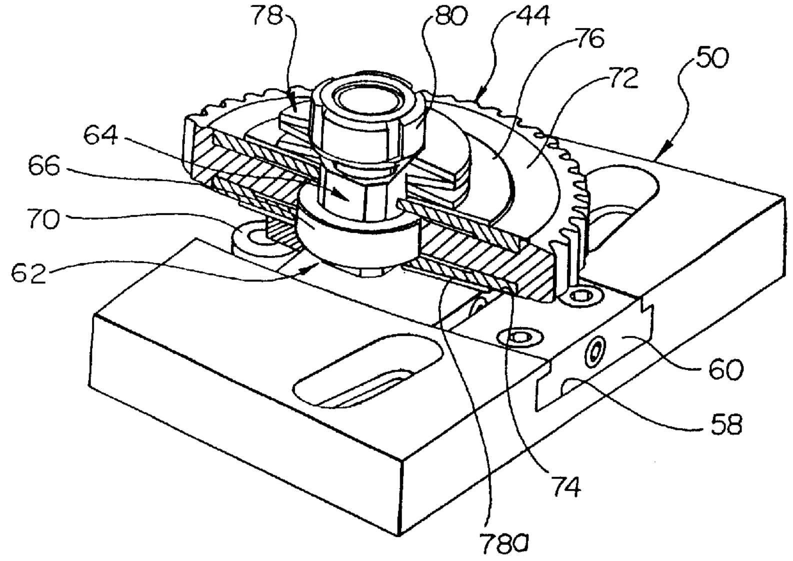
FIG. 3 shows an enlarged view through the gear of the device of FIG. 2.

As is apparent from FIG. 3 retaining plate 50 has a T-shaped groove 58 which is closed by a corresponding element 60 at its right-hand end. Groove 58 has further disposed in it a bearing component 62 which is movably guided in the groove and holds a trunnion 64 about which gear 44 is rotatably supported. This can be accomplished by means of a bearing 66 to the structure of which no particular reference is intended to be made herein.

As is obvious from FIG. 1 a compression spring 68, by which bearing component 62 is biased towards ram 20, is disposed between element 60 and bearing component 62. Groove 58 also has accommodated in it a roller 70 made from cushioning elastomeric material, against which bearing component 62 will run when gear 44 does not get in engagement with a tooth system 40 of ram 20.

Arranged in a recess of gear 44 on opposed front-end faces is a braking disk 72 and 74 each. It is made of an appropriate friction material and is connected to trunnion 64 in a pivotally stable manner. A thrust washer 76, 78*a* is disposed above and below breaking disk 72, 74. Arranged above thrust washer 76 is a pack of disk springs 78, which is biased by means of a nut 80 which is screwed onto a threaded portion (not to be seen) of trunnion 64. Hence, rotation of gear 44 will be possible only by applying an adequate torque which overcomes the braking torque. The braking torque may be adjusted via nut 80 and the pack of disk springs 78.

As can be seen, gear 44 engages tooth system 40 of the ram. Initially, each of rams 20*a*, 20*b*, 20*c* is rotated by the braked gear 44. This continues until the braking torque of gear 44 is larger than the torque of the ram because of the rising pressing power applied by pressure roller 28. After this, it is not the ram which is rotated, but it is the braked gear 44. As soon as the braking torque of gear 44 is larger again than the torque of the pressing ram with the pressing power dropping it is the ram again which is rotated. What is achieved thereby is that while the ram is still rotating under a pressing power and is able to be released from the tablet this pressing power may be very small so as to avoid any wear between the head of the pressing ram and the pressure roller.

The resilient mounting of gear 44 makes it easy for the gear to engage the tooth system of the ram irrespective of whether the teeth of gear 44 and those of the tooth system get in mesh immediately.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A rotary press for pressing cylindrical compacts, in particular tablets, comprising a rotatably driven rotor including a die-plate which has die bores and upper and lower guide means for upper and lower, the rams cooperating with the die bores, a pressing station having an upper and a lower pressure roller whereby a compacting force is applied to the upper and lower rams when passing the pressing station, each upper and lower ram having an annular toothing at the circumference thereof, and an opposed toothing in the range of the pressing station for the cooperation with the annular toothing of the rams, the opposed toothing being formed by a rotatably supported gear a predetermined braking torque being applied to the gear, the braking torque being selected such that it is smaller than the torque which is necessary to rotate a ram under maximum pressing force in the pressing station.

2. The rotary compression press according to claim 1, characterized in that the braking torque corresponds to a torque of the ram (18, 20) which is produced under a pressing power which is a fraction of the maximum pressing power.

3. The rotary compression press according to claim 1, characterized in that a bearing component (62) for the gear (42, 44) is biased by a spring assembly (68) towards the rams (18, 20).

4. The rotary compression press according to claim 2, characterized in that a bearing component (62) for the gear (42, 44) is biased by a spring assembly (68) towards the rams (18, 20).

5. The rotary compression press according to claim 3, characterized in that the spring assembly (68) presses the bearing component (62) against a compliant stop (70), preferably a roller made from elastomeric material, when the gear (42, 44) is out of engagement with the tooth system (38, 40).

6. The rotary compression press according to claim 1, characterized in that the gear has at least one front-end face fitted with a braking disk (72, 74) which cooperates with the gear (42, 44).

7. The rotary compression press according to claim 6, characterized in that the braking disk is pressed against a thrust washer via a braking spring.

8. The rotary compression press according to claim 7, characterized in that the braking spring is defined by a pack of disk springs (78).

9. The rotary compression press according to claim 7, characterized in that the bias of the braking spring is variable.

10. The rotary compression press according to claim 8, characterized in that the bias of the braking spring is variable.

* * * * *